A. J. KRANTZ & G. E. SMITH.
TROLLING HOOK.
APPLICATION FILED JAN. 18, 1909.
932,477.
Patented Aug. 31, 1909.
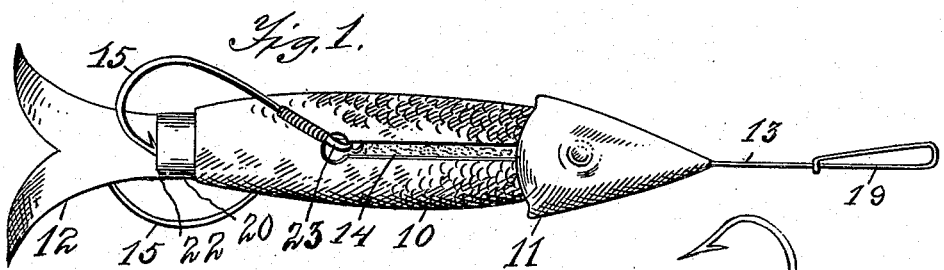
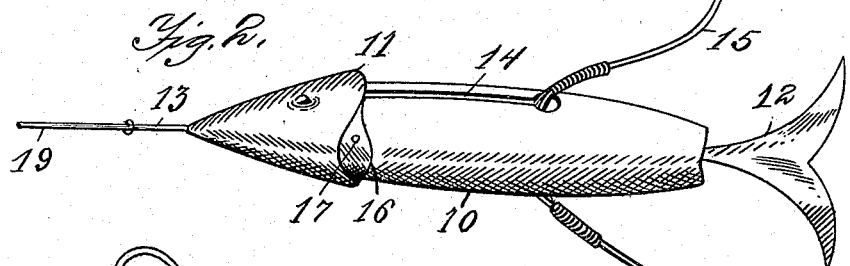
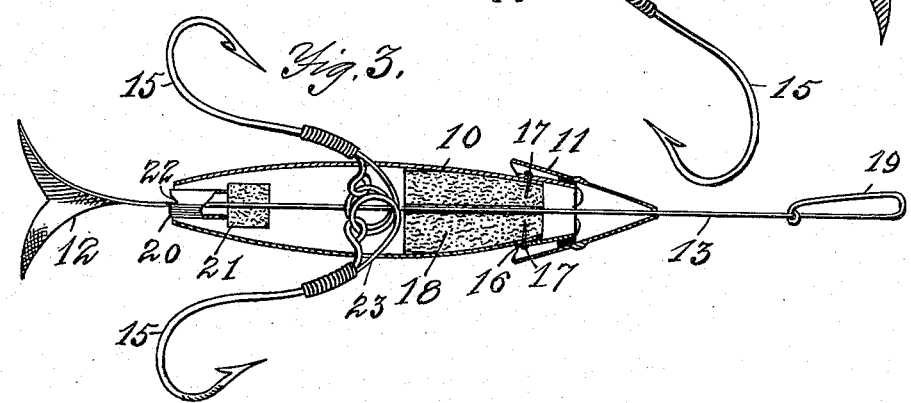
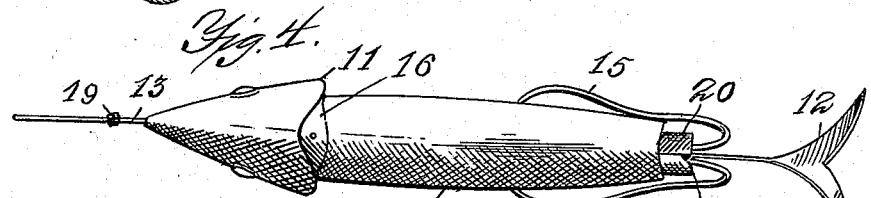
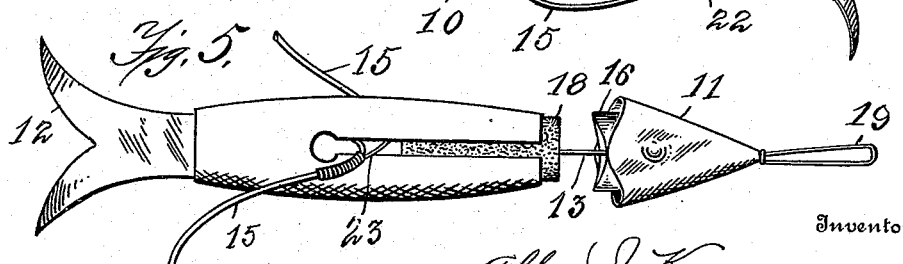

ced rearwardly off
UNITED STATES PATENT OFFICE.

ALFRED J. KRANTZ AND GUSTAF E. SMITH, OF JAMESTOWN, NEW YORK, ASSIGNORS, BY DIRECT AND MESNE ASSIGNMENTS, OF ONE-HALF TO SAID SMITH AND ONE-HALF TO JOHN AUGUST ANDERSON, OF JAMESTOWN, NEW YORK.

TROLLING-HOOK.

932,477.  Specification of Letters Patent.  Patented Aug. 31, 1909.

Application filed January 18, 1909. Serial No. 472,794.

*To all whom it may concern:*

Be it known that we, ALFRED J. KRANTZ and GUSTAF E. SMITH, citizens of the United States, and residents of Jamestown, in the county of Chautauqua and State of New York, have invented new and useful Improvements in Trolling-Hooks, of which the following, taken in connection with the accompanying drawings, is a full, clear, and exact description.

The invention relates to improvements in trolling hooks for catching fish, and the object of the invention is to provide a spring trolling hook of simple and durable construction which provides means for engaging the points of the hooks, so that, when so set the device may be drawn through the weeds or past obstructions without catching on to the same, and yet when the fish bites on to the trolling hook, the spring hooks will be immediately released and thrust into the mouth of the fish; and the invention consists in the novel arrangement and combination of the parts as hereinafter set forth and pointed out in the claims.

In the drawings, Figure 1 is a side elevation of the improved trolling hook, with the hooks in the set position. Fig. 2 is a plan view of the trolling hook with the spring hooks in the released position. Fig. 3 is a lengthwise sectional view of the trolling hook showing the construction of the same. Fig. 4 is a plan view of the trolling hook with the hooks in the set position. Fig. 5 is a side elevation of the trolling hook with the parts of the body separated to show the construction of the same.

Similar numerals refer to corresponding parts in the several views.

The numeral 10 indicates a tubular body, preferably in the form of a fish with representation of scales on the outer surface, as shown in Fig. 1. Tubular body 10 may be made of any suitable material, such as metal, rubber, or any other strong and durable material out of which it might be modeled or shaped.

The numeral 11 indicates the head of the fish which is preferably made in the form of a flattened cone shaped cap, having the inner part 16 which forms the attaching means for head 11 to body 10. The tail preferably made in a forked or fish tail form and the flukes of the tail are turned in opposite directions, so as to cause the entire hook to whirl when drawn through the water, a suitable swivel being attached to the trolling hook for that purpose. Tail part 12 is attached to a wire 13, which extends lengthwise through the entire fish and has the loop 19 for attaching to the line by means of a swivel, the flat tubular part 20 of the tail 12 is slidable but not revolubly mounted in the end of the body 10. Hence the tail 12 and wire 13 to which the tail 12 and tube 20 are attached can not turn in the body 10 and therefore the turned flukes of the tail cause the entire hook to turn when a proper swivel is attached to the loop 19.

Body portion 10 is provided with slots 14 in the opposite sides to receive therein the spring hooks 15. The body 10 is attached to the head 11 by means of the part 16, as hereinbefore stated, and suitable pins or screws 17. In the front end of the body portion 10, the cork 18 is placed so as to hold the wire 13 in line and also form a stop for the spring hooks 15, also to form a convenient holding means for the pins 17 to connect the head 11 and body 10.

As shown in Fig. 5, the slots 14 extend to the front end of body portion 10 so that said body portion can be slipped rearwardly off from cork 18 and spring hooks 15, when disengaged from part 15, by withdrawing the pins 17, so that new hooks may be attached should one of the hooks be broken.

On tail 12 is a short tubular portion 20 which is slidably mounted within the rear end of body 10, the cork 21 being attached to the inner end of tubular part 20. Wire 13 extends through cork 21, and is attached to the tail part 12 within the tubular part 20. A small cut 22 is provided on opposite sides of tubular part 20 next to tail 12 to facilitate the entering of the fish hook points within the tubular part 20. It is apparent that the hooks 15 may be turned into the form shown in Figs. 1 and 4, and while held in that position, the tail 12 and tube 20 may be pulled out locking the points firmly within the tube 20.

The hooks 15 are attached to the opposite ends of the coil spring 23, said ends being extended out on opposite sides of body 10 through the slots 14 and firmly attached to the shanks of the hooks. The inner ends of the hooks are attached around the wire of the spring 23. In this form the wire spring 23 is mounted on wire 13 so that it may slide backward and forward within body 10 between corks 18 and 21.

It is obvious that the hooks may be set in a tense position to spring outward as hereinbefore described and as shown in Figs. 1 and 4, and that as soon as a fish bites on to the body 10, the continued pull of the line on wire 13 will draw the tubular part 20 off from the points of the hooks 15, allowing them to spring outwardly in opposite directions by spring 23, impaling the mouth of the fish on opposite sides, and insuring a firm hooking of the fish. It is also apparent that when in a set position, the trolling hook can be drawn through the weeds, where the fish are most likely to lie, without catching on the weeds. This is the great difficulty with the common form of open hooks which is entirely obviated by our improved trolling hook. The spring hooks also insure that both hooks shall firmly impale the fish.

We claim as new:

1. A trolling hook comprising an outer open-ended tube having openings in the opposite sides, an inner open-ended tube slidably mounted in said outer open ended tube, spring fish hooks mounted in said openings in the sides of said outer tube, the points of said fish hooks releasably held at a tension in the open end of said slidable inner tube, and means for attaching said inner tube to the line to release said hooks.

2. A trolling hook comprising a tubular body in the form of a fish having openings in the opposite sides, an inner open-ended tube slidably mounted in one end of said tubular body, fish hooks resiliently mounted in said openings in the sides of said tubular body to spring outward, said fish hooks releasably held at a tension by said inner tube, and means for withdrawing said inner tube from said hooks to release the same.

3. A trolling hook comprising a tubular body having an open rear end, a line attaching wire extending through said body, a tail portion attached to said wire and slidably mounted in said open rear end of said body, fish hooks resiliently mounted in said body, and means on said tail portion for holding the points of said hooks.

4. In a trolling hook, a tubular body in the form of a fish, a head on said body, a tail slidably mounted in the rear end of said body, a wire attached to said tail portion and slidably mounted through said body and head for attaching the line, a spring in said body, fish hooks attached to said spring and adapted to engage said tail in a tense or set position.

5. In a trolling hook, the combination of a tubular body 10, a head 11 attached to said tubular body, a tail 12, a wire 13 attached to said tail and extending through the body having a loop 19 for attachment to the line, a spring 23 in said body, fish hooks 15 attached to said spring in said body, and means on said tail for engaging the points of said hooks in a tense or set position.

6. In a trolling hook, the combination of a tubular fish shaped body 10, a fish-shaped head 11 removably attached to said tubular body, a tail 12 having a wire 13 attached thereto and slidably mounted lengthwise through the body, said wire having a looped end 19 for attaching to the line, a spring 23 mounted in said body on said wire, fish hooks 15 attached to the opposite ends of said spring to be thrown outward thereby, and a flat open-ended tube 20 on said tail having notches 22 therein to receive the points of said hooks and hold them at a tension, substantially as and for the purpose specified.

In testimony whereof we have signed our names to this specification in the presence of two subscribing witnesses.

ALFRED J. KRANTZ.
GUSTAF E. SMITH.

Witnesses:
A. W. Nettle,
F. M. Brunson.